United States Patent
Wissing et al.

(10) Patent No.: US 7,572,506 B2
(45) Date of Patent: Aug. 11, 2009

(54) AQUEOUS PRIMER SURFACER COMPOSITIONS

(75) Inventors: Klaus Wissing, Duesseldorf (DE); Wilfried Collong, Wermelskirchen (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 507 days.

(21) Appl. No.: 11/159,380

(22) Filed: Jun. 22, 2005

(65) Prior Publication Data

US 2006/0003166 A1    Jan. 5, 2006

Related U.S. Application Data

(60) Provisional application No. 60/584,726, filed on Jun. 30, 2004.

(51) Int. Cl.
*B32B 27/38* (2006.01)
*B32B 27/40* (2006.01)
*B32B 27/30* (2006.01)
*B32B 15/092* (2006.01)
*B32B 15/095* (2006.01)
*B32B 15/082* (2006.01)
*B05D 1/36* (2006.01)
*B05D 1/38* (2006.01)
*C08L 63/00* (2006.01)

(52) U.S. Cl. .............. 428/414; 428/413; 428/416; 428/418; 427/386; 427/402; 427/409; 427/410; 525/523; 525/528; 525/529; 525/530; 525/533; 523/400; 523/402; 523/414

(58) Field of Classification Search ............ 427/386, 427/402, 409, 410; 428/413, 414, 416, 418; 523/400, 402, 414; 525/523, 524, 525, 526, 525/529, 530, 533, 528
See application file for complete search history.

(56) References Cited

U.S. PATENT DOCUMENTS

| | | | |
|---|---|---|---|
| 4,197,389 A | | 4/1980 | Becker et al. |
| 4,251,597 A * | | 2/1981 | Emmons et al. ............ 428/500 |
| 4,498,163 A | | 2/1985 | Segawa et al. |
| 4,524,107 A | | 6/1985 | Marchetti et al. |
| 4,558,090 A | | 12/1985 | Drexler et al. |
| 4,886,845 A | | 12/1989 | Becker et al. |
| 4,987,163 A | | 1/1991 | Becker et al. |
| 5,141,987 A | | 8/1992 | Nachtkamp et al. |
| 5,418,264 A * | | 5/1995 | Obloh et al. ............... 523/414 |
| 5,539,023 A | | 7/1996 | Dreischhoff et al. |
| 5,880,209 A | | 3/1999 | Patzschke et al. |
| 6,653,369 B2 | | 11/2003 | Gerlitz et al. |
| 2004/0110872 A1 | | 6/2004 | Hoefer et al. |

FOREIGN PATENT DOCUMENTS

WO    WO 00/04106    1/2000

OTHER PUBLICATIONS

Written Opinion of the International Searching Authority (International Application No. PCT/US2005/022544) mailing date of Nov. 2, 2005.

* cited by examiner

*Primary Examiner*—Michael J Feely
(74) *Attorney, Agent, or Firm*—Sudhir G. Deshmukh

(57) ABSTRACT

The invention relates to aqueous coating compositions for producing primer and/or filler layers in a multi-layer coating, in particular in vehicle coating, comprising the following components:
A) at least one water-dilutable epoxy resin,
B) at least one polyamine curing agent,
C) optionally, at least one water-dilutable polyurethane resin,
D) water and
E) optionally, pigments, fillers, conventional paint additives and/or organic solvents,
wherein the polyamine curing agent B) comprises:
B1) 5-95% by weight of at least one amino functional compound with at least two secondary and/or primary amino groups and
B2) 95-5% by weight of at least one water-dilutable (meth) acrylic copolymer,
wherein the percentages by weight of components B1) and B2) are based on the solids and add up to 100% by weight.

15 Claims, No Drawings

AQUEOUS PRIMER SURFACER COMPOSITIONS

CROSS-REFERENCE TO RELATED APPLICATION

This application claims the benefit of U.S. Provisional Application Ser. No. 60/584,726 filed on Jun. 30, 2004 which is hereby incorporated by references in its entirely.

FIELD OF THE INVENTION

The invention relates to two-pack aqueous coating compositions based on epoxy resins and polyamine curing agents which are very suitable for producing primer coats and/or filler layers in multi-layer construction, in particular in vehicle painting.

DESCRIPTION OF RELATED ART

Aqueous coating compositions based on epoxy resins and polyamine curing agents are known from the prior art.

EP 0523610 describes aqueous coating compositions which contain water-dilutable epoxy resins, water-dilutable or water-soluble polyamines and 5 to 80% by weight, based on the sum of solids weights of epoxy resin and polyamine, of a water-dilutable polyurethane resin with a molar mass number average of 500 to 500,000 g/mol.

WO 00/04106 describes water-dilutable primers which are based on an aqueous epoxy resin dispersion, an aqueous dispersion of a curing agent for the epoxy groups and 0.5 to 50% by weight, based on the quantity of epoxy resin, of an aqueous acid-functional polyacrylate latex, the latter being produced by emulsion or solution polymerisation in the aqueous phase. These primers exhibit an improved inter-layer adhesion to a subsequently applied bitumen topcoat.

The drawback of the epoxy/amine systems of the prior art is that in applications with greater coat thicknesses, for example, dry coating thicknesses of about 100 μm, they have inadequate non-sag properties. Curing of the applied coatings is also inadequate, so, for example, assembly stability of the applied coating is only provided after relatively long periods of time. However, rapid assembly stability is important, for example, for smooth efficient running in a painting workshop for vehicles. Only an inadequate visual surface quality is likewise sometimes achieved when painting over these coatings.

There is therefore a need for coating compositions, in particular in vehicle painting, which may be applied, even in greater coat thicknesses, in a sag-resistant manner and which exhibit fast curing and therefore provides early assembly stability. In addition, the applied coatings should exhibit good adhesion to the substrate and paint coats applied thereon and, during overpainting; coatings with a visually perfect appearance should result.

SUMMARY OF THE INVENTION

The invention therefore relates to aqueous coating compositions comprising the following components:
A) at least one water-dilutable epoxy resin,
B) at least one polyamine curing agent,
C) optionally, at least one water-dilutable polyurethane resin,
D) water and
E) optionally, pigments, fillers, conventional paint additives and/or organic solvents, wherein the polyamine curing agent B) comprises:

B1) 5-95% by weight, preferably 30-60% by weight, of at least one amino functional compound with at least two secondary and/or primary amino groups and
B2) 5-95% by weight, preferably 40-70% by weight, of at least one water-dilutable (meth)acrylic copolymer,
wherein the percentages by weight of components B1) and B2) are based on solids and add up to 100% by weight.

Preferably, the aqueous coating compositions comprises
A) 20-90% by weight, particularly preferably 40-70% by weight of the at least one water-dilutable epoxy resin,
B) 5-80% by weight, preferably 15-50% by weight, of the at least one polyamine curing agent and
C) 0-60% by weight, preferably 5-15% by weight, of the at least one water-dilutable polyurethane resin, wherein the percentages by weight of components A), B) and C) are based on solids and add up to 100% by weight.

(Meth)acrylic should be taken to mean acrylic and/or methacrylic here and below.

It has surprisingly been found that the coating compositions according to the invention may be applied in a sag-resistant manner in one spray pass up to resultant dry coat thicknesses of about 80 to 150 μm at a usual spraying viscosity of, for example, 30-50 s (flow time measured in a 4 mm cup according to DIN 53211). Filler coats with fast curing and therefore, early assembly stability are produced.

DETAILED DESCRIPTION OF THE EMBODIMENTS

All known epoxy resins which can be used for aqueous systems are suitable as epoxy resin A), such as are familiar to a person skilled in the art for aqueous two-pack epoxy/amine systems. These can be di- or polyepoxides with an epoxide equivalent weight of 200 to 10,000, preferably of 500-1500. These are film-forming epoxy resins which are present as an aqueous dispersion or as a water-dilutable resin. Examples of such polyepoxides are polyglycidyl ethers based on aliphatic or aromatic diols, such as, bisphenol A, bisphenol F or polyalkylene glycols. Self-emulsifying non-ionic stabilised epoxy resins, for example, as are described, for example, in EP 0272595 (U.S. Pat. No. 4,886,845) and EP 346742 (U.S. Pat. No. 4,498,163) are very suitable.

The epoxy resins can, for example, be self-emulsifying epoxy resins with an epoxide equivalent weight of 250 to 10,000 and which are obtained by reacting a) epoxide compounds with at least two epoxide groups per molecule and an epoxide equivalent weight of 100 to 20,000, b) aromatic polyols and c) aliphatic polyols.

The epoxide compounds a) are polyepoxides with, on average, at least two epoxide groups per molecule. These epoxide compounds can be saturated, unsaturated, aliphatic, cycloaliphatic, aromatic or heterocyclic and optionally, also comprise hydroxyl groups. They may also comprise substituents, such as, alkyl substituents, aryl substituents or ether groupings. The epoxide compounds a) are preferably polyglycidyl ethers based on polyhydric, preferably dihydric, alcohols, phenols, hydration products of these phenols and/or novolaks (reaction products of monohydric or polyhydric phenols with aldehydes, in particular with formaldehyde in the presence of acid catalysts). The epoxide equivalent weight of these epoxide compounds is preferably 160 to 500. Examples of polyhydric phenols are resorcinol, hydroquinone, 2,2-bis-(4-hydroxyphenyl)propane (bisphenol A), dihydroxydiphenylmethane (bisphenol F, optionally, isomeric mixtures), 4,4'- dihydroxy-3,3'-dimethyidiphenylpropane, 4,4'-dihydroxydiphenyl, 4,4'-dihydroxydiphenylcyclohexane, 4,4'-dihydroxybenzophenol, bis-(4-hydroxyphenyl)-1,1-ethane, and 1,5-dihydroxy-naphthalene.

The polyglycidyl ethers of polyhydric alcohols are also suitable. Examples of polyhydric alcohols are ethyleneglycol, diethyleneglycol, triethyleneglycol, 1,2- and 1,3-propyleneglycol, polyoxypropyleneglycols, 1,4-butyleneglycol, 1,5-pentanediol, 1,6-hexanediol, glycerol, bis-(4-hydroxycyclohexyl-2,2-propane. The polyglycidyl ethers of polycarboxylic acids may also be used, which are obtained by reacting, for example, epichlorohydrin with an aliphatic, aromatic or cycloaliphatic polycarboxylic acid. Examples of polyglycidyl ethers of polycarboxylic acids are adipic acid glycidylester, phthalic acid glycidylester and hexahydrophthalic acid glycidylester. Polyglycidyl ethers of bisphenol A are particularly preferably used.

The aromatic polyols b) are preferably dihydric phenols, the halogenated products thereof and/or novolaks. The OH groups are preferably directly bound to the aromatic ring. Bisphenol A is particularly preferably used.

The aliphatic polyols c) are polyols selected from the group comprising polyacrylate, polyester, polyether, polycarbonate and polyurethane polyols. The aliphatic polyols are equipped in a manner known to a person skilled in the art with hydrophilic groups ensuring adequate water dilutability. Polyether polyols are preferably used as aliphatic polyols c). These can, for example, be polyether polyols with a molar mass weight average Mw of 600 to 12,000 g/mol, preferably of 2,000 to 8,000 g/mol, and hydroxyl values of, for example, 10 to 200 mg KOH/g, preferably of 15 to 100 KOH/g. The aliphatic polyols preferably have only primary end groups. Examples of preferred polyether polyols are polyethylene, polypropylene, polybutylene glycols and block copolymers of ethylene oxide and propylene oxide. Mixtures of the polyalkylene glycols can be used. Polyethylene glycols are preferably used.

Epoxy functional polymers, for example, glycidyl-functionalised (meth)acrylic copolymers, can also be used as component A).

It must be ensured that the epoxy resins are soluble in the aqueous phase, or can be dispersed or emulsified therein This can be achieved in that the epoxy resins themselves have hydrophilic structures, such as, polyether structures, and/or in that external anionic, cationic and/or non-ionic emulsifiers are used in the conversion into the water phase. Non-ionic emulsifiers may, in particular, be used. Examples of non-ionic emulsifiers are ethoxylated and/or propoxylated alcohols, alkyl phenols, fatty acids, fatty amines, fatty alcohols, ethylene oxide-propylene oxide block copolymers and optionally, modified fatty acid esters of polyalkoxylated polyhydric alcohols. The epoxy resins of component A) are preferably used in the form of aqueous dispersions. The epoxy resins can be used individually or in combination.

The polyamine curing agent B) contains at least one amino-functional compound B1) and at least one water-dilutable (meth)acrylic copolymer B2). Amino-functional compound B1) and (meth)acrylic copolymer B2) are preferably present side-by-side here as separate components in the form of a mixture. A partial reaction between existing amino groups and optionally present groups of the (meth)acrylic copolymers that are reactive with amino groups is, however, not ruled out. However, the stability of the polyamine curing agent B) must be ensured.

The amino group-containing compounds B1) are any compounds with at least two primary and/or secondary amino groups, such as, polyamines, polyamido amines, Mannich bases, amine-epoxide adducts and/or modified derivatives thereof. The amino group-containing compounds can be present as monomers and/or polymers. They are preferably present as an aqueous solution or dispersion.

Examples of polyamines are divalent or polyvalent amines, such as, aliphatic polyalkylene amines, such as, diethylenetriamine, triethylenetetramine, tetraethylenepentamine, pentaethylenehexamine, propylenediamine, dipropylenetriamine, also 2,2,4- and/or 2,4,4-trimethylhexamethylenediamine, bis-(3-aminopropyl)-amine, 1,4-bis-(3'-aminopropyl)-piperazine, N,N-bis(3-aminopropyl)ethylenediamine, neopentanediamine, 2-methyl-1,5-pentandiamine, 1,3-diaminopentane, hexamethylenediamine, and cycloaliphatic amines, such as, 1,2- or 1,3-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophoronediamine and reaction products thereof, 4,4'-diaminodicyclohexylmethane and -propane, 2,2-bis-(4-aminocyclohexyl)-methane and -propane, 3,3'-dimethyl-4,4'-diaminodicyclohexylmethane, 3-amino-1-cyclohexylaminopropane, 1,3- and 1,4-bis-(aminomethyl)-cyclohexane.

Araliphatic amines, in particular those in which aliphatically bound amino groups are present, are also suitable, for example, meta- and para-xylylene diamine or the hydration products thereof.

In addition to the above-mentioned polyamines, water-soluble polyoxyalkylene polyamines with molar masses of, for example, 100 to 2,000 g/mol, for example, commercially available under the name Jeffamine®, can also be used.

Polyamido amines which can be used are, for example, those which are obtained by reaction of polyamines with mono- or polycarboxylic acids, for example, dimerised fatty acids.

Suitable Mannich bases are those which are produced by condensation of polyamines, such as, diethylenetriamine, triethylenetetramine, isophoronediamine, 2,2,4- and 2,4,4-trimethylhexamethylendiamine, 1,3- and 1,4-bis(aminomethyl) cyclohexane and meta- and para-xylylenediamine with aldehydes, preferably, formaldehyde, and mono- or polyhydric phenols with at least one nuclear position reactive with aldehydes, for example, the various cresols and xylenols, para-tert.-butylphenol, 4,4'-dihydroxydiphenylmethane, but preferably, phenol.

Amino urethanes, which can be obtained by reaction of
a) compounds comprising at least one 2-oxo-1,3-dioxolane-group and/or 2-oxo-1,3-dioxane-group (cyclic carbonate group) with
b) one or more amines with at least one primary and/or secondary amino group, wherein the ratio of the number of cyclic carbonate groups to the number of primary and/or secondary amino groups is 1:10 to 1:1.1, are also very suitable as amino group-containing crosslinking agents and can preferably be reacted with one or more hydrophilic water-dilutable epoxy compounds in order to thus ensure adequate water dilutability and stable dispersion of the amino urethanes. The hydrophilic water-dilutable epoxide compounds are reaction products of epoxide compounds with at least two epoxide groups per molecule with polyalkylene polyetherpolyols and/or with polyalkylene polyethers with primary and/or secondary terminal amino groups. Amino urethanes of this type are described, for example, in EP 0661363.

Suitable as amine-epoxide adducts are simple reaction products of polyamines, for example, ethylenediamine, propylenediamine, hexamethylenediamine, 2,2,4- and 2,4,4-trimethylhexamethylenediamine, meta-xylylenediamine, isophoronediamine and/or bis-(aminomethyl)-cyclohexane with terminal mono- or polyepoxides, such as, propyleneoxide, hexeneoxide, cyclohexeneoxide, or with glycidyl ethers such as, phenylglycidyl ether, tert.-butylglycidyl ether, ethylhexylglycidyl ether, butylglycidyl ether or with glycidyl esters, such as, glycidyl ester of versatic acid, or with polyglycidyl ethers and esters, as well as modified amine-epoxide adducts. Modified amine-epoxide adducts can preferably be used which, for example, still contain ether groupings. Examples of amine-epoxide adducts which are very suitable and their production are described, for example, in EP 0000605, EP 0610787 and EP 1266920. Thus, for example, amine-epoxide adducts can be used which are obtained by reacting an adduct of at least one polyepoxide (a) and at least one polyalkylene polyether polyol (b) with a reaction product of an amine (d) and an epoxide (d) or by a reaction with an amine (c) and subsequent reaction with an epoxide (d), wherein the quantities of components used have to be such that an amino-functional adduct is produced.

The amino group-containing compounds B1) can each be used individually or in combination.

The polyamine component B1) preferably contains, in particular when using amine-epoxide adducts, a polyamine fraction, such as, diamines, for example, ethylenediamine, propylenediamine, hexamethylenediamine, 2,2,4- and 2,4,4-trimethylhexamethylenediamine, meta-xylylenediamine, isophoronediamine and/or bis-(aminomethyl)-cyclohexane. This fraction can, for example, be 25% by weight, relative to the total quantity of polyamine component B1). These diamines can then, for example, simultaneously be used as neutralising agents to neutralise the water-dilutable (meth) acrylic copolymers B2).

The polyamine curing agents B) contain, apart from the amino group-containing compounds B1), at least one water-dilutable (meth)acrylic copolymer as a fundamental constituent. The (meth)acrylic copolymer is a conventional (meth) acrylic copolymer preferably produced in the organic phase from radically polymerisable, olefinically unsaturated monomers. The (meth)acrylic copolymers have, for example, a molar mass number average (Mn) of 1,500 to 20,000, preferably 1,500 to 10,000 g/mol. The (meth)acrylic copolymers can contain functional groups, such as hydroxyl groups or carboxyl groups. However, they are preferably free of epoxide groups and other functional groups that are reactive with amino groups.

Monomers which, apart from at least one olefinic double bond, contain further functional groups, and monomers which, apart from at least one olefinic double bond, do not contain any further functional groups, may be used as radically polymerisable, olefinically unsaturated monomers for producing the (meth)acrylic copolymers. Further functional groups can, for example, be hydroxyl groups and/or carboxyl groups.

Suitable hydroxy-functional unsaturated monomers are, for example, hydroxyalkyl esters of alpha, beta-olefinically unsaturated monocarboxylic acids with primary or secondary hydroxyl groups. These, for example, can be the hydroxyalkyl esters of acrylic acid, methacrylic acid, crotonic acid and/or isocrotonic acid. The hydroxyalkyl esters of (meth) acrylic acid are preferred. The hydroxyalkyl radicals can, for example, contain 2 to 10 carbon atoms, preferably 2 to 6 carbon atoms. Examples of suitable hydroxyalkyl esters of alpha, beta-olefinically unsaturated monocarboxylic acids with primary hydroxyl groups are hydroxyethyl(meth)acrylate, hydroxypropyl(meth)acrylate, hydroxybutyl(meth) acrylate, hydroxyamyl(meth)acrylate, hydroxyhexyl(meth) acrylate. Examples of suitable hydroxyalkylesters with secondary hydroxyl groups are 2-hydroxypropyl(meth)acrylate, 2-hydroxybutyl(meth)acrylate, 3-hydroxybutyl(meth) acrylate.

Reaction products of alpha, beta-olefinically unsaturated monocarboxylic acids with glycidyl esters of saturated monocarboxylic acids branched in the alpha position are, for example, glycidyl esters of saturated alpha-alkyl alkane monocarboxylic acids or alpha, alpha'-dialkyl alkane monocarboxylic acids, can also be used as hydroxy-functional unsaturated monomers. They are preferably reaction products of (meth)acrylic acid with glycidyl esters of saturated alpha, alpha-dialkyl alkane monocarboxylic acids with 7 to 13 carbon atoms in the molecule, particularly preferably with 9 to 11 carbon atoms in the molecule. These reaction products can be formed before, during or after the copolymerisation reaction.

Reaction products of hydroxyalkyl(meth)acrylates with lactones can also be used as the hydroxy-functional unsaturated monomers. The hydroxyalkyl(meth)acrylates mentioned above may, for example, be used. Suitable lactones are, for example, those, which contain 3 to 15 carbon atoms in the nucleus, wherein the nucleus can also comprise different substituents. Preferred lactones are gamma-butyrolactone, delta-valerolactone, epsilon-caprolactone, beta-hydroxy-beta-methyl-delta-valerolactone, lambda-laurinlactone or mixtures thereof. Epsilon-caprolactone is particularly preferred. The reaction products are preferably those comprising one mol of a hydroxyalkyl ester of an alpha, beta-unsaturated monocarboxylic acid and 1 to 5 mol, preferably on average 2 mol, of a lactone. The hydroxyl groups of the hydroxyalkyl ester can be modified with the lactone before, while or after carrying out the copolymerisation reaction.

Suitable unsaturated monomers with carboxyl groups are, for example, olefinically unsaturated monocarboxylic acids, such as, acrylic acid, methacrylic acid, crotonic acid, isocrotonic acid, itaconic acid. Acrylic acid and methacrylic acid are preferably used.

Radically polymerisable, olefinically unsaturated monomers which, apart from at least one olefinic double bond, do not contain any further reactive functional groups are, for example, esters of unsaturated carboxylic acid with aliphatic monohydric branched or unbranched and cyclic alcohols with 1 to 20 carbon atoms. Examples of unsaturated carboxylic acids are acrylic acid, methacrylic acid, crotonic acid and isocrotonic acid. They are preferably esters of (meth)acrylic acid. Examples of (meth)acrylic acid esters with aliphatic alcohols are methylacrylate, ethylacrylate, isopropylacrylate, tert.-butylacrylate, n-butylacrylate, isobutylacrylate, 2-ethylhexylacrylate, laurylacrylate, stearylacrylate and the corresponding methacrylates. Examples of (meth)acrylic acid esters with cyclic alcohols are cyclohexylacrylate, trimethylcyclohexylacrylate, 4-tert. butylcyclohexylacrylate, isobornylacrylate and the corresponding methacrylates.

Further suitable unsaturated monomers without further functional groups are, for example, vinylether, such as, isobutylvinylether and vinylesters, such as, vinylacetate, vinylpropionate and vinylesters of saturated monocarboxylic acids branched in the alpha-position, e.g., vinylesters of saturated alpha, alpha'-dialkylalkanmonocarboxylic acids and vinylesters of saturated alpha-alkylalkynmonocarboxylic acids with 5 to 13 carbon atoms each, preferably, 9 to 11 carbon atom in the molecule.

Vinyl aromatic hydrocarbons are very suitable as unsaturated monomers without further functional groups, those with 8 to 9 carbon atoms in the molecule being preferred. Examples of such monomers are styrene, alpha-methylstyrene, chlorostyrene, 2,5-dimethylstyrene, p-methoxystyrene, vinyltoluenes. Styrene is preferably used.

Small proportions of olefinically polyunsaturated monomers may also be used. These are monomers with at least two radically polymerisable double bonds in the molecule. Examples of these are divinylbenzene, 1,4-butanedioldiacrylate, 1,6-hexanedioldiacrylate, neopentylglycoldimethacrylate and glycerindimethacrylate.

To ensure adequate water dilutability, the (meth)acrylic copolymers comprise hydrophilic, ionic and/or non-ionic groups. They preferably comprise carboxyl groups which are neutralized with bases, such as, ammonia or amines.

(Meth)acrylic copolymers based on hydroxyfunctional and/or non-hydroxyfunctional (meth)acrylic acid esters, vinylaromatic hydrocarbons, e.g., styrene, and (meth)acrylic acid are very suitable. In addition, further unsaturated monomers can optionally be used.

The (meth)acrylic copolymers can be present as pure (meth)acrylic copolymers, in the form of seed polymers or modified in some other way. In the case of seed polymers, the (meth)acrylic copolymer is produced in the presence of a further binder, for example, a polyester or polyurethane. The (meth)acrylic copolymer can preferably be produced in the presence of an oligomeric or polymeric polyester. The polyester is conventionally obtainable by polycondensation of one or more diols and/or polyols and one or more dicarboxylic acids and/or derivatives thereof, and has, for example, a calculated molar mass of 200 to 5,000 g/mol, preferably of 500 to 3,000 g/mol.

The (meth)acrylic copolymers are produced by radical copolymerisation. This can take place in a manner familiar to a person skilled in the art by conventional methods, for example, substance, solution or pearl polymerization, particularly preferably by radical solution polymerization by using radical initiators in organic solvents. The organic solvents are then distilled off, if required, the copolymers are neutralized and converted into the aqueous phase.

When seed polymers are used, the radical polymerization takes place in the presence of a further binder, for example, the above-mentioned polyester. The end product is in the form of an aqueous dispersion in each case.

The polyamine component, which is preferably present in aqueous form, and the poly(meth)acrylate resin, which is preferably present in the form of an aqueous dispersion, are, for example, mixed with one another in the aqueous phase to produce the polyamine curing agent B). Compatibility of the components is assumed. Dilution with water is possible, if required.

The aqueous coating compositions according to the invention preferably contain at least one water-dilutable polyurethane resin C). The polyurethane resin C) is a conventional water-dilutable polyurethane. The polyurethanes are not crosslinked and, in general, do not contain any further reactive groups which could lead to crosslinking with the epoxy/amine system. The solubility or dilutability of the polyurethanes in water can be achieved by emulsifiers or hydrophilic ionic groups and/or non-ionic groups. The polyurethane binders preferably contain anionic groups, for example, carboxylic groups or sulphonic acid groups, which after neutralization with bases, such as, ammonia or amines, allow a conversion into the water phase. Suitable polyamine compounds B1) used as crosslinking agents can also be used as bases for neutralization. Ionic and non-ionic emulsifiers conventional in the paint sector can be used as emulsifiers, for example, alkyl sulphonates.

The polyurethane resins are produced in a conventional manner by polyaddition from hydroxy-functional and isocyanate-functional components. A functionalized, for example, NCO-functional polyurethane prepolymer, can, for example, firstly be produced in a first step, and in a second step can be chain-lengthened with suitable compounds, in the case of NCO-functional prepolymer as, for example, with hydroxy- and/or amine-functional compounds. The polyurethane resin or the polyurethane prepolymer can be produced here from a) one or more polyols with a molar mass number average Mn of 500 to 5,000, preferably of 1,000 to 2,000, b) one or more polyisocyanates and c) at least one compound with more than one group reactive with isocyanate groups, at least one ionic group or group capable of forming ions and optionally further components. Component a) is linear or branched polyols, preferably diols with a molar mass number average (Mn) of 500 to 5,000 g/mol, preferably of 1,000 to 2,000 g/mol. Polyesterpolyols, polycarbonatepolyols, polyetherpolyols, polylactone-polyols and/or poly(meth)acrylatepolyols or the corresponding diols can be used as component a). The polyols are preferably substantially free of carboxyl groups. They can, for example, have acid values of <3, preferably <1. The polyols and diols can each be used individually or in combination with one another.

In addition to component a), one or more low molecular polyhydric alcohols, preferably difunctional alcohols, with a molar mass of <356 g/mol may optionally also be used. Examples of these are ethyleneglycol, propanediol-1,2 and -1,3, butanediol-1,3 and -1,4, hexanediol-1,6, octanediol-1,8, cyclohexanediol-1,2 and -1,4, dimethylolpropane and neopentylglycol.

Any organic polyisocyanates, preferably diisocyanates, may be used individually or in combination as component b) for producing the polyurethanes or polyurethane prepolymers. The polyisocyanates can, for example, have an aromatic, aliphatic and/or cycloaliphatic nature. These can also be diisocyanates containing ether or ester groups. Examples of suitable diisocyanates are trimethylendiisocyanate, tetramethylenediisocyanate, pentamethylenediisocyanate, hexamethylenediisocyanate, propylenediisocyanate, ethylenediisocyanate, 2,3-dimethylethylenediisocyanate, 1-methyltrimethylenediisocyanate, 1,3-cyclopentylene-diisocyanate, 1,4-cyclohexylenediisocyanate, 1,2-cyclohexylendiisocyanate, 1,3-phenylenediisocyanate, 1,4-phenylendiisocyanate,2,4-toluylene-diisocyanate,2,6-toluylene-diisocyanate, 1-isocyanatomethyl-5-isocyanato-1,3,3-trimethylcyclohexane,bis-(4-isocyanato-phenyl)-methane,4, 4-diisocyanato-diphenylether, 1,5-dibutylpentamethylenediisocyanate, 2,3-bis-(8-isocyanato-octyl)-4-octyl-5-hexylcyclohexane, 3-isocyanatomethyl-1-methylcyclohexylisocyanate, and/or 2,6-diisocyanatomethyl-capronate.

Component c) for producing the polyurethanes or polyurethane prepolymers is preferably low-molecular compounds which comprise at least one, preferably more than one, particularly preferably two, groups which are reactive with isocyanate groups and at least one ionic group or group capable of forming ions. Groups capable of forming ions include, for example, carboxyl, phosphoric acid and sulphonic acid groups. Preferred anionic groups are carboxyl groups. Groups capable of forming cations are, for example, primary, secondary and tertiary amino groups or onium groups, such as, quaternary ammonium, phosphonium and/or tertiary sulphonium groups. Preferred are anionic groups or groups capable of forming anions. Suitable groups reactive with isocyanate are, in particular, hydroxyl groups and primary and/or secondary amino groups.

Preferred compounds, which can be used as component c) are those which contain carboxyl and hydroxyl groups. Examples of such compounds are hydroxy alkane carboxylic acids of the following general formula:

wherein Q represents a straight or branched hydrocarbon radical with 1 to 12 carbon atoms and x and y each represent 1 to 3. Examples of these are citric acid and tartaric acid. Carboxylic acids where x=2 and y=1 are preferred. A preferred group of dihydroxy alkane acids are alpha,alpha-dimethylolalkane acids. Preferred are alpha,alpha-dimethylolpropionic acid and alpha,alpha-dimethylolbutyric acid.

Further examples of dihydroxyalkane acids which may be used are dihydroxypropionic acid, dimethylol acetic acid, dihydroxy succinic acid or dihydroxybenzoic acid. Further compounds which can be used as component c) are amino group-containing acids, for example, alpha,alpha-diaminovaleric acid, 3,4-diaminobenzoic acid, 2,4-diamino-toluenesulphonic acid and 4,4-diamino-di-phenylethersulphonic acid.

Components a), b) and c) are reacted with one another in a conventional manner known to a person skilled in the art. In the process, the components are reacted in such quantities that a desired reaction product, for example, with free isocyanate groups or with hydroxyl groups, is produced. If a polyurethane prepolymer containing NCO-groups is obtained, it can then be chain-lengthened with a polyol or polyamine component.

Conversion into the aqueous phase can then take place after neutralisation. The number average molar mass (Mn) of the polyurethane resin can, for example, be 500 to 500,000 g/mol, preferably 1,500 to 200,000 g/mol.

Examples of polyurethane dispersions which may be used are described in EP 0438090 and EP 0427979 (U.S. Pat. No. 5,141,987). In the latter these are polyurethanes with urethane, urea and carbonate groups. EP 89 497 describes amine chain-lengthened polyurethane ureas.

The coating composition according to the invention is conventionally provided in the form of a two-pack composition. At least the binder components A) and B) which are reactive with one another must be stored separately and can only be mixed with one another just before application. The polyurethane resin can be present in the epoxy resin component A), in the polyamine-curing agent B), or in both components. Care should be taken that there is compatibility of the respective mixture, and dispersions which are stable in storage are produced. The polyurethane resin C) can be mixed with component A) or B) by mixing the respective existing aqueous dispersions, or the polyurethane resin C) is, for example, initially mixed with epoxy resin A) and the mixture then jointly converted into the aqueous phase. Of course all three components A), B) and C) can also be stored separately until they are applied. The polyurethane resin C), diluted with water and optionally organic solvents, can, for example, be used in the form of an adjustment dilution to adjust the required application viscosity of the finished coating composition.

The epoxy resin A) and the polyamine curing agents B) are preferably used in such quantity ratios that there is an equivalent ratio of the epoxy groups in A) to the amino groups in B) of 1:5 to 5:1, preferably of 1:2 to 2:1.

The aqueous coating compositions according to the invention can contain pigments and/or fillers. The pigments are, in particular, colour and/or effect-imparting pigments. Anti-corrosion pigments, such as, a zinc phosphate, may also be provided.

All conventional paint pigments with an organic or inorganic nature are suitable as colour-imparting pigments. Examples of inorganic or organic colour-imparting pigments are titanium dioxide, micronized titanium dioxide, iron oxide pigments, carbon black, azo pigments, phthalocyanine pigments, quinacridone or pyrrolopyrrole pigments.

Fillers may also in particular be provided in the coating compositions. These are the conventional fillers which can be used in the paint industry. Examples of fillers are silicon dioxide, aluminium silicate, barium sulphate, calcium carbonate and talc.

The coating compositions also contain water and can additionally contain small quantities of organic solvents.

The organic solvents optionally present in the coating compositions are conventional paint solvents. These can originate from the production of the binders or be added separately. Examples of suitable solvents are monohydric or polyhydric alcohols, for example, propanol, butanol, hexanol; glycolether or -ester, e.g., diethyleneglycoldialkylether, dipropyleneglycoldialkyl-ether, each with C1 to C6 alkyl, ethoxypropanol, butylglycol; glycols, e.g., ethyleneglycol, propyleneglycol and their oligomers, N-methylpyrrolidone and ketones, e.g., methylethylketone, acetone, cyclohexanone; aromatic or aliphatic hydrocarbons, e.g., toluene, xylene or linear or branched aliphatic C6 to C12 hydrocarbons. Water-miscible solvents are preferably used. The organic solvents are present, for example, in an amount up to 10 to 15% by weight maximum, relative to the total coating composition. Water-miscible organic solvents are preferably used.

The coating compositions can also contain conventional paint additives. Examples of conventional paint additives are flow-control agents, rheology-influencing agents, such as, highly dispersed silica or polymeric urea compounds, thickeners, such as, partially crosslinked polyacrylate thickeners, or associative thickeners based on polyurethane, defoaming agents, wetting agents, anti-cratering agents, corrosion inhibitors, substrate wetting agents, adhesion promoters and curing accelerators. The additives are used in conventional quantities known to person skilled in the art.

The coating compositions can be produced in a known manner in that the individual constituents are mixed with one another and conventionally homogenised or ground. Therefore, existing pigments and/or fillers can either be dispersed in the epoxy resin component and/or in the polyamine component. However, it is also possible to carry out the dispersions with an additional wetting resin.

The invention therefore also relates to a process for preparing aqueous coating compositions comprising the following steps:

I. providing at least one water-dilutable epoxy resin A),

II. preparing at least one polyamine curing agent B) by mixing 5-95% by weight of at least one amino functional compound with at least two secondary and/or primary amino groups with 5-95% by weight of a water-dilutable (meth) acrylic copolymer, wherein the percentages by weight of components B1) and B2) are based on solids and add up to 100% by weight, and III. mixing the epoxy resin A) and the polyamine curing agent B) prior to application of the coating composition.

Optionally, water, pigments, fillers, conventional paint additives and/or organic solvents and optionally, at least one water-dilutable polyurethane resin can be mixed with epoxy resin A) and/or polyamine curing agent B).

In general, the spraying viscosity can, if needed, still be adjusted with water or organic solvents before application. In this case, a composition containing the polyurethane resin C) can also be used as the adjusting dilution, as already mentioned. The coating compositions can be applied by known methods, in particular by means of spray application.

The coating compositions according to the invention are particularly suitable for producing filler and/or primer coats of a multi-layered coating.

The invention therefore also relates to the use of the coating composition for producing multi-layered coatings, wherein the filler and/or primer coats of multi-layered coatings, in particular, are provided by the coating compositions according to the invention.

The filler and/or primer coats can be applied in a conventional manner to optionally pre-coated substrates.

Metal and plastics material substrates, in particular the substrates known in the automotive industry, are suitable as the substrates, for example, iron, zinc, aluminium, magnesium, stainless steel or their alloys, and polyurethanes, polycarbonates or polyolefins. The filler coats can, for example, be applied to optionally pre-treated substrates as such, such as, polished steel plate, sanded, initially sanded plant finishes or old finishes, or to conventional electrophoretically painted substrates or primers. After drying and optionally sanding, the filler and/or primer coats can be overpainted with further coating compositions without problems.

Coatings made of primers according to the invention can, for example, be overpainted with conventional fillers or with fillers according to the invention. Coatings made of fillers according to the invention can be overpainted using conventional topcoats. The topcoats can be pigmented one-coat finishes, for example, based on two-pack acrylate/polyisocyanates, or be conventional basecoat/clear coat constructions. They can be overpainted with solvent-based or water-based coating agents. The present invention therefore also relates to a method for multi-coat painting, comprising the following steps:

1. Applying a filler and/or primer coat from a filler and/or primer coating composition to an optionally pre-coated substrate;
2. Applying a topcoat layer from a pigmented one-coat finish or a pigmented based coat and a transparent clear coat onto the layer applied in step one; and
3. Curing the coating, wherein the filler and/or primer coat is applied from a coating composition according to this invention.

The filler and/or primer coats can be cured at ambient temperature or forced at elevated temperatures. For example, they can be cured at ambient temperature over a prolonged period, for example, within 10 to 20 hours. However, optionally, after a drying time of, for example, 10 to 30 minutes, they can also be subjected to drying at elevated temperatures, for example, for 20 to 60 minutes at, for example, 40 to 80° C. They can also be cured at elevated temperatures of, for example, above 80° C. to 160° C., preferably from above 80° C. to 140° C. Coatings obtained from the aqueous coating compositions according to the invention exhibit fast hard-drying and curing even under moderate curing conditions at curing temperatures of, for example, up to 80° C. Early assembly stability is therefore ensured. Subsequent overpainting with topcoats can, however, also take place wet-on-wet in that, for example, after a drying time of, for example, 30 minutes to about two hours at, for example, ambient temperature, the subsequent topcoat layer is directly applied and then cured, e.g., under the above mentioned conditions.

The coating compositions can, in particular, be applied as filler coating compositions in one spray pass in higher coat thickness so as to be sag-resistant, for example, resultant drying coat thicknesses of about 80 to 150 µm. After overpainting with topcoats, homogeneous coatings with smooth, defect-free surfaces are obtained. A further advantage is the very good adhesion to a wide variety of metal substrates, for example, those mentioned above.

The coating compositions according to the invention are suitable for vehicle and industrial coating, in particular for vehicle and vehicle part coating. They can be used particularly advantageously in vehicle refinishing and coating commercial vehicles, rail vehicles, goods and passenger wagons as well as buses.

The invention will be described in more detail with reference to the following examples.

EXAMPLES

Production of an Acrylate/Polyester Seed Polymer (Component B2):

120 g of a linear polyester (polyester of hexane diol, hexahydrophathalic acid anhydrite and adipic acid, having a hydroxyl value of 185 and an acid value of 4 to 5), 120 g ethoxypropanol and 240 g Cardura® E10 (glycidyl ester of versatic acid) were introduced into a reaction vessel with agitator, internal thermometer, heater and reflux condenser, stirred and heated to 150° C. To this receiving flask were added, within five hours, from separate receiving flasks, 420 g of a monomer mixture consisting of 21% by weight hydroxyethyl acrylate, 56% by weight styrene and 23% by weight acrylic acid, and 66 g of an initiator solution (Trigonox® B dissolved in ethoxy propanol) were added while stirring. The mixture was kept at 150° C. for three hours before it was cooled and filtered. The seed polymer thus obtained had a solids content of about 80% by weight and an acid value of about 30 mg KOH/g. The solvent was removed as far as possible under vacuum at about 110° C. and a degree of neutralisation of the carboxyl groups of 70% theoretical was adjusted with dimethylethanolamine after cooling to about 90° C. 50 parts by weight of the deionised water preheated to 60° C. were added to 50 parts by weight of this neutralised seed polymer at a temperature of 80° C. while stirring. An aqueous dispersion with a solids content of about 45% by weight was obtained.

Production of a Polyurethane Resin (Component C)

Production of an aqueous polyurethane dispersion according to DE-OS 36 28 124, production example 2 250 g of a linear polyester (polyester of adipic acid, isophathalic acid, hexane diol; having a hydroxyl value of 77 and an acid value of 10), were heated in a reaction vessel with agitator, internal thermometer, heater and reflux condenser with 80 g methyl ethyl ketone and 53.3 g N-methylpyrrolidone to 70° C., and 74 g hydrated bisphenol A and 28.3 g dimethylol propionic acid were added at this temperature. The mixture was heated to 120° C. and stirred for half an hour at this temperature. 146.7 g hexamethylene diisocyanate were then added at 70° C. After an exothermic phase (temperature <90° C.) the mixture was held at 75° C. until the residual isocyanate values were <1.8. The hot resin mixture was dispersed in 891 g deionised water and 23.5 g triethylamine with vigorous stirring. Five minutes after the end of the addition of resin, 10.5 g propylene diamine-1,3 in 75 g deionised water were added and the mixture stirred for a further hour. A aqueous dispersion with the following characteristic data resulted:

| | |
|---|---|
| Solids content: | 33% by weight |
| Viscosity (20° C.): | 109 mPa · s |
| pH: | 9.8 |
| Acid number: | 27 (mg KOH per g solid resin) |
| Mn: | about 120,000 g/mol |

Example 1

Production of Filler Coating Compositions
Binders used:
Epoxy resin A: commercially available epoxy resin (53% in water, Beckopox EP 384w, Surface Specialities UCB)
Polyamine compound B1: commercially available polyamine (80% in water; Beckopox EH 623w, Surface Specialities UCB)
(Meth)acrylcopolymer B2/I: see seed polymer produced above
(Meth)acrylic copolymer B2/II: commercially available copolymer (40% in water; Viacryl® VSC 6265w/40wa; Surface Specialties UCB)
Polyurethane Resin C: as polyurethane resin C produced above
Production of a Pigmented Base Component S:
The following components were introduced and stirred together:
50 parts by weight epoxy resin A 1 part by weight of a commercially available wetting and dispersing additive (Additol® VXW 6208/60, Surface Specialities UCB)
0.3 parts by weight of a commercially available defoaming agent (1:1-mixture of Byk® 019 and Byk® 024, Byk Chemie)
1 part by weight of a commercially available substrate wetting additive (Byk® 346, Byk Chemie)
7.7 parts by weight deionised water The following components were scattered in while stirring:
6 parts by weight commercially available zinc phosphate
12 parts by weight commercially available titanium dioxide
6 parts by weight commercially available talc
8 parts by weight commercially available magnesium-calcium carbonate
8 parts by weight commercially available kaolin
The mixture was first pre-dispersed with a dissolver and then dispersed on a pearl mill to a grain size of about 25 μm.
Production of Polyamine Curing Agents B:
Polyamine curing agent B/I: 25 parts by weight polyamine compound B1, 50 parts by weight (meth)acrylic copolymer B2/I and 25 parts by weight deionised water were mixed together.
Polyamine curing agent B/II: 25 parts by weight polyamine compound B1, 50 parts by weight (meth)acrylic copolymer B2/II and 25 parts by weight deionised water were mixed together.
Comparison curing agent $B_{comp}$: 25 parts by weight polyamine compound B1 and 25 parts by weight deionised water were mixed together.
Production of Curing Agent Components H (Polyamine Curing Agent B and Polyurethane Resin C):
Curing agent H/I: 100 parts by weight polyamine curing agent B/I were mixed with 40 parts by weight polyurethane resin C.
Comparison curing agent $H/I_{comp}$: 50 parts by weight $B_{comp}$ were mixed with 40 parts by weight polyurethane resin C.
Curing agent H/II: 100 parts by weight polyamine curing agent B/II were mixed with 20 parts by weight polyurethane resin C.
Comparison curing agent $H/II_{comp}$: 50 parts by weight $B_{comp}$ were mixed with 20 parts by weight polyurethane resin C.
Production of Filler Coating Composition F:
Filler coating composition F/I: 100 parts by weight base component S were mixed with 47 parts by weight curing agent H/I and adjusted with 3 parts by weight deionised water to an application viscosity of 50 s flow time (measured in a 4 mm cup according to DIN 53211).
Comparison filler $F/I_{comp}$: 100 parts by weight base component S were mixed with 30 parts by weight comparison curing agent $H/I_{comp}$ and adjusted with 6 parts by weight deionised water to an application viscosity of 50 s flow time (measured in a 4 mm cup according to DIN 53211).
Filler coating composition F/II: 100 parts by weight base component S were mixed with 40 parts by weight curing agent H/II and adjusted with 3 parts by weight deionised water to an application viscosity of 50 s flow time (measured in a 4 mm cup according to DIN 53211).
Comparison filler $F/II_{comp}$: 100 parts by weight base component S were mixed with 23.3 parts by weight comparison curing agent $H/II_{comp}$ and adjusted with 6,3 parts by weight deionised water to an application viscosity of 50 s flow time (measured in a 4 mm cup according to DIN 53211).
Application
The fillers F/I and F/II produced above and the comparison fillers were doctored onto a sheet of glass using a stepped doctor blade which applied wet film coat thicknesses of 200 to 500 μm in 50 μm steps in one application. The respective sheets of glass were immediately put down vertically. An assessment was made as to above what wet film coat thickness the filler ran off. (With a volume solid of the adjusted filler of about 40%, the dry film coat thickeners may be calculated by multiplication at 0.4%.)

| Filler | F/I | $F/I_{comp}$ | F/II | $F/II_{comp}$ |
|---|---|---|---|---|
| sagging limit (stepped doctor blade) / Wet film coat thickness | 300 μm OK | Only less than 200 μm OK | 300 μm OK | Only less than 200 μm OK |

A respective further film was applied to a sheet of glass using a 120 μm doctor blade. After drying 30 minutes at 60° C. the pendulum hardness to König was determined.

| Filler | F/I | $F/I_{comp}$ | F/II | $F/II_{comp}$ |
|---|---|---|---|---|
| König pendulum hardness | 18 | 15 | 20 | 17 |

An acceptable hardness was achieved.

The fillers F/I and F/II produced above and the comparison fillers were applied by means of gravity spray gun onto a cleaned and sanded vertical steel sheet in one spray pass in a dry coating thickness of 80 μm. After a drying time of about 30 minutes, the fillers were cured for 10 minutes at 60° C. A commercially available pigmented one-coat finish (Standox Standocryl® 2K-HS-car paint) was then applied and cured within 30 minutes at 60° C. Visually perfect paint surfaces resulted in cases of fillers F/I and F/II according to the invention. Only inadequate visual surface quality was achieved for coatings with comparative fillers $F/I_{comp}$ and $F/Ii_{comp}$ due to the poor sag-resistance of the comparative fillers. The following result was produced with respect to the non-sag properties:

| Filler | F/I | F/I$_{comp}$ | F/II | F/II$_{comp}$ |
|---|---|---|---|---|
| sagging behaviour | OK | Not OK sagging | OK | Not OK sagging |

The above results obtained by spraying confirm the results obtained with stepped doctor blade tests with respect to the non-sag properties of the respective fillers.

What is claimed is:

1. An aqueous coating composition comprising the following components:
   A) at least one water-dilutable epoxy resin,
   B) at least one polyamine curing agent,
   C) optionally at least one water-dilutable polyurethane resin,
   D) water and
   E) optionally pigments, fillers, conventional paint additives and/or organic solvents, wherein the polyamine curing agent B) comprises a mixture of:
   B1) 5-95% by weight of at least one amino functional compound with at least two secondary and/or primary amino groups and
   B2) 95-5% by weight of at least one water-dilutable (meth)acrylic copolymer, wherein the percentages by weight of components B1) and B2) are based on solids and add up to 100% by weight; wherein said (meth)acrylic copolymer contains carboxyl groups and is free of epoxide groups and other functional groups that are reactive with amino groups, and wherein said carboxyl groups are neutralized with bases.

2. The coating composition according to claim 1, comprising:
   A) 20-90% by weight of the at least one water-dilutable epoxyresin,
   B) 5-80% by weight of the at least one polyamine curing agent and
   C) 0-60% by weight of the at least one water-dilutable polyurethane resin,
   wherein the percentages by weight of components A), B) and C) are based on solids and add up to 100% by weight.

3. The coating composition according to claim 2, comprising 5 to 50% by weight of the at least one water-dilutable polyurethane resin C).

4. The coating composition according to claim 1, wherein the polyamine curing agent B) comprises:
   B1) 30-60% by weight of at least one amino functional compound with at least two secondary and/or primary amino groups and
   B2) 40-70% by weight of at least one water-dilutable (meth)acrylic copolymer,
   wherein the percentages by weight of components B1) and B2) are based on solids add up to 100% by weight.

5. The coating composition according to claim 1, wherein the at least one epoxy resin A) comprises at least one polyglycidyl ether based on polyhydric alcohols or phenols.

6. The coating composition according to claim 5, wherein the at least one epoxy resin A) comprises at least one polyglycidyl ether based on bisphenol A and/or bisphenol F.

7. The coating composition according to claim 1, wherein the at least one water-dilutable (meth)acrylic copolymer B2 is a copolymer based on (meth)acrylic acid esters, styrene, (meth)acrylic acid and optionally further unsaturated monomers.

8. The coating composition according to claim 1, wherein the at least one water-dilutable (meth)acrylic copolymer B2 is a seed polymer produced in the presence of an oligomeric or polymeric polyester.

9. The coating composition according to claim 1, wherein the at least one aminofunctional compound B1 is an amine-epoxy adduct.

10. The coating composition according to claim 1 formulated as a two-pack coating composition wherein said epoxy resin component is stored separately from said polyamine curing agent component.

11. The coating composition according to claim 10 wherein said polyurethane resin component is present in said epoxy resin component, said polyamine curing agent component, or in both said components.

12. A multi-layer coating on a substrate comprising at least one coating layer formed from the coating composition of claim 1, wherein said at least one coating layer is present as a filler coat or a primer coat.

13. A multi-layer coating on a vehicle or vehicle part comprising at least one layer formed from the coating composition of claim 1, wherein said at least one coating layer is present as a filler coat or a primer coat.

14. A method for multi-layer coating comprising the steps:
   (1) applying a coating layer to an optionally pre-coated substrate,
   (2) applying a topcoat layer from a pigmented one coat finish or a pigmented based coat and a transparent clear coat onto the coating layer applied in step one; and
   (3) curing the coating layer applied in step one, wherein the coating layer applied in step one is formed from the coating composition according to claim 1 and is present as a filler coat or a primer coat.

15. The method according to claim 14, wherein the substrates are vehicles or vehicle parts.

* * * * *